US005903983A

United States Patent [19]

Jungmann et al.

[11] Patent Number: 5,903,983

[45] **Date of Patent: *May 18, 1999**

[54] KEYLESS CLAMP ASSEMBLY FOR RECIPROCATING TOOL

[75] Inventors: Richard H. Jungmann, Richfield; Ken R. Jordan, Sussex; Bernhard Palm, Brookfield, all of Wis.

[73] Assignee: Milwaukee Electric Tool Corp., Brookfield, Wis.

[ * ] Notice: This patent is subject to a terminal disclaimer.

[21] Appl. No.: 08/820,879

[22] Filed: Mar. 21, 1997

Related U.S. Application Data

[63] Continuation of application No. 08/541,894, Oct. 10, 1995, which is a continuation-in-part of application No. 08/345,997, Nov. 29, 1994, abandoned.

[51] Int. Cl.[6] .................... B27B 19/09

[52] U.S. Cl. .................... 30/392; 30/339; 83/699.21; 279/75; 279/82; 279/905

[58] Field of Search .................... 30/339, 392, 393, 30/394; 83/699.21; 279/74, 75, 82, 904, 905

[56] References Cited

U.S. PATENT DOCUMENTS 2,049,898 8/1936 Driest .
2,565,344 8/1951 Benham .
3,114,402 12/1963 Jacoff .
3,259,158 7/1966 Garamy .
3,338,278 8/1967 Reuterfors .
3,521,686 7/1970 Weinmann .
3,583,716 6/1971 Daniel .
3,750,283 8/1973 Hoffman .
3,802,079 4/1974 Ketchpel, Jr. et al. .
3,823,473 7/1974 Hoffman .
3,927,893 12/1975 Dillon et al. .
3,964,163 6/1976 Russo .
4,011,657 3/1977 Vance .
4,020,555 5/1977 Hedrick .
4,083,112 4/1978 Palm .
4,106,181 8/1978 Mattchen .
4,204,692 5/1980 Hoffman .
4,285,129 8/1981 Hoffman .
4,294,013 10/1981 Krieg .
4,299,402 11/1981 Hoffman .
4,351,112 9/1982 Nalley .
4,441,255 4/1984 Hoffman .
4,470,196 9/1984 Hoffman .
4,528,753 7/1985 Kuhlmann et al. .
4,550,500 11/1985 Kuhlmann et al. .
4,594,781 6/1986 Hoffman .
4,601,477 7/1986 Barrett et al. .
4,648,182 3/1987 Hoffman .
4,739,557 4/1988 Wagner .................... 30/392
4,941,246 7/1990 Finnegan .
5,085,280 2/1992 Pollak et al. .
5,103,565 4/1992 Holzer, Jr. .

(List continued on next page.)

FOREIGN PATENT DOCUMENTS 1484393 9/1977 United Kingdom .
1597240 9/1981 United Kingdom .
2173734 10/1986 United Kingdom .
WO 89/08524 9/1989 WIPO .
95/27583 10/1995 WIPO .

*Primary Examiner*—Eugenia A. Jones
*Attorney, Agent, or Firm*—Michael Best & Friedrich LLP

[57] ABSTRACT

A clamp for the blade of a hand held reciprocating tool includes a spindle coupled to the drive mechanism. A slot is formed in the spindle for receiving the blade tang and a collar is threadably received on the spindle. A blade clamping member is disposed between the collar and the blade and includes an engaging member for engaging a hole in the blade tang and a pair of ears which engage the upper and lower shoulders of the blade tang to provide three points of engagement when the collar is tightened. The clamp also includes a nose section which engages the blade at its junction with the tang to provide reinforcement against breakage.

14 Claims, 5 Drawing Sheets

U.S. PATENT DOCUMENTS

| | | |
|---|---|---|
| 5,165,173 | 11/1992 | Miller . |
| 5,233,892 | 8/1993 | Roberts . |
| 5,272,948 | 12/1993 | Theising . |
| 5,322,302 | 6/1994 | Quirijnen . |
| 5,324,052 | 6/1994 | Ortmann . |
| 5,340,129 | 8/1994 | Wright . |
| 5,351,590 | 10/1994 | Everts et al. . |
| 5,363,733 | 11/1994 | Baird et al. . |
| 5,402,580 | 4/1995 | Seto et al. . |
| 5,421,232 | 6/1995 | Laverick . |
| 5,433,457 | 7/1995 | Wright . |
| 5,439,472 | 8/1995 | Evans et al. . |
| 5,443,276 | 8/1995 | Nasser et al. . |
| 5,458,346 | 10/1995 | Briggs . |
| 5,487,221 | 1/1996 | Oda et al. . |
| 5,575,071 | 11/1996 | Phillips et al. ............................ 30/392 |

10
22
12
16
14

32
64
23
36
20

12
60
52
44
42
54
48
28
38
14
26
40
56
37
46
5
5
62
24
34

6
20
32
62
45
14
60
26
68
56
66
28
69

24
46
6

14
68
69
66
78
71
70
21
20
62
60
64
64

38
42
41
40
46
48
18
54
40
36
23
26
12
34

42
38
44
52
54
48
40
50
18
46

70
56
54
38
64
14
66

64

KEYLESS CLAMP ASSEMBLY FOR RECIPROCATING TOOL

This is a continuation of co-pending application Ser. No. 08/541,894, filed Oct. 10, 1995, entitled KEYLESS CLAMP ASSEMBLY FOR RECIPROCATING TOOL, pending, which is a continuation-in-part of application Ser. No. 08/345,997, filed Nov. 29, 1994, now abandoned.

BACKGROUND OF THE INVENTION

Hand held reciprocating tools, such as electric reciprocating saws, include removable blades which permit the use of different cutting edges as may be necessary for cutting different materials and for the replacement of worn or damaged blades. This requires a blade mounting system which allows rapid blade replacement while accurately and firmly coupling the blade to the tool. One problem with blades for hand held reciprocating saws is breakage at the junction between the blade and the substantially narrower tang.

SUMMARY OF THE INVENTION

It is an object of the invention to provide a new and improved blade clamping assembly for reciprocating tools.

A further object of the invention is to provide a blade clamping assembly for reciprocating saws which does not require the use of a key or tool for blade replacement.

Another object of the invention is to provide a keyless blade clamping assembly for reciprocating saws which permits rapid blade replacement and firmly and accurately holds the blade in position.

A still further object of the invention is to provide a blade clamping assembly for reciprocating saws which reduces blade breakage.

These and other objects and advantages of the present invention will become more apparent from the detailed description thereof taken with the accompanying drawings.

In general terms the invention comprises a reciprocating tool including a reciprocating member and clamping means for clamping one end of a blade to the reciprocating member, the blade having a hole formed in the one end. The clamping means includes a first member for engaging the blade at spaced apart points and a second member coupled to the first member for engaging the hole and so as to provide three points of contact between the clamping means and the blade. Means are also provided for engaging the clamping means and the reciprocating means for adjustably forcing the first and second members into pressure engagement with the end of the blade.

DETAILED DESCRIPTION OF THE PREFERRED EMBODIMENTS

Figure 1:
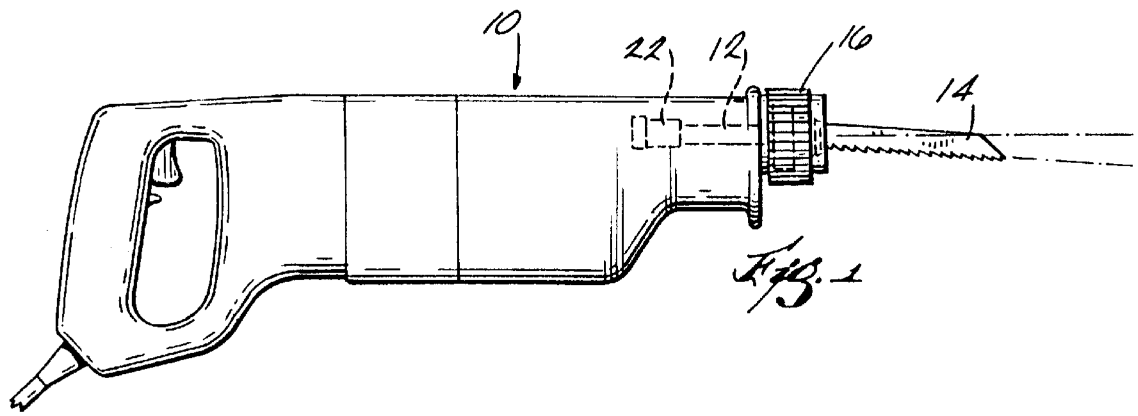
FIG. 1 shows a tool in which the invention may be used.

FIG. 1 shows a hand held reciprocating tool, such as a saw 10, having an axially reciprocating spindle 12 which is coupled to the saw blade 14 by a clamping assembly 16.

The clamping assembly 16 according to the preferred embodiment of the invention is shown in FIGS. 2–5 to include a metallic clamping member 18 for securing the blade 14 to the spindle 12 and a sleeve 20 threadably received on the spindle 12 for forcing the clamping member 18 against the blade 14 and the spindle 12 thereby securing the blade 14 to the spindle. The spindle 12, the clamping member 18 and the sleeve 20 reciprocate within a guide mounted on the tool 10.

The spindle 12 is an elongate shaft member having one end 22 constructed and arranged for being secured to the operating mechanism of the saw 10 whereby the spindle is moved axially when the saw 10 is energized. The opposite end 23 of the spindle has external threads 24 and an axially extending slot 26 for receiving the tang 28 of the blade 14. The slot 26 is offset relative to the axis of spindle 12 and divides the end 23 into left and right portions 32 and 34. An inclined surface 36 is formed in the forward portion 32 of spindle 12 and intersects the slot 26 intermediate its ends and extends outwardly therefrom. The opposite side of the slot 26 is defined by a generally planar surface 37.

The clamping member 18 has a forward nose portion 38 and a rear wedge portion 40. The surface 41 of member 18 is generally planar while the opposite surface (FIG. 3) of the nose portion 38 includes a section of a frusto cone 42 and a short cylindrical section 44. At the sides of the surface 41 and adjacent the junction of the sections 42 and 44, there are a pair of extending ears 45 and 46.

Figure 4:
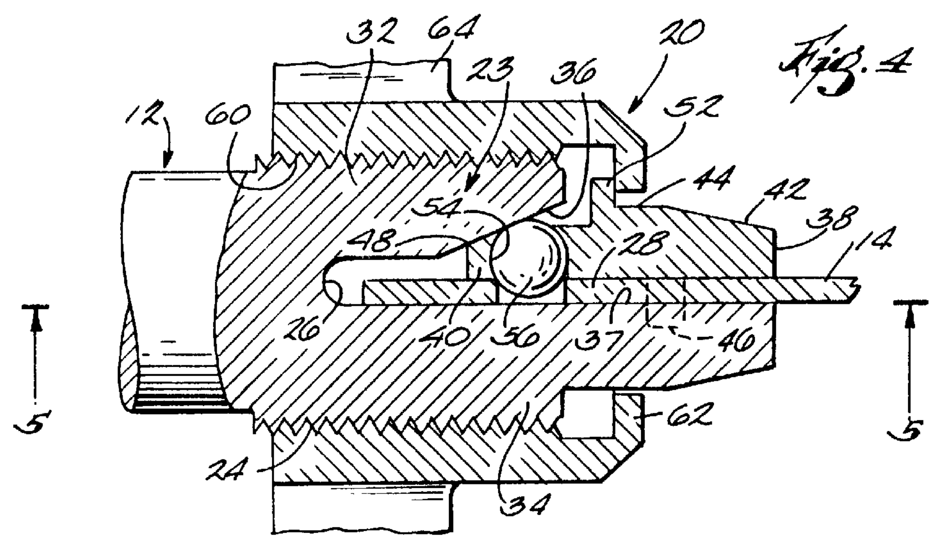
FIG. 4 is a cross-sectional view of the embodiment of FIG. 2.

The wedge portion 40 includes a surface 48 which is inclined relative to the planar surface 41 at the same angle that the surface 36 in spindle 12 is inclined relative to the axis of the slot 26. Inwardly of the inclined slot there is an axially extending surface 50, and a laterally extending flange 52 disposed between the nose portion 38 and the wedge portion 40. In the embodiment of the invention shown in FIGS. 2–6, a recess 54 is formed in the wedge portion 40 for housing a metallic ball or engaging member 56 which is suitably fixed within recess 54 so that only a portion extends from the surface 41 (FIG. 4), that extending portion of the ball functioning to engage a hole in the saw blade as will be described. The opposite portion of the ball 56 (as seen in FIG. 4) is ground to conform to the contours of the surfaces 48 and 54. Instead of a ball 56, a section of a sphere could also be formed on surface 41 and project therefrom in the same manner as ball 56. In other embodiments of the invention the ball 56 could be replaced by a member having a conical projection for engaging the hole in the saw blade, or the ball 56 could be replaced by a pin or projection having other configurations.

The sleeve 20 is a generally tubular member having internal threads 60 which are complementary to the threads 24 formed on the end 23 of the spindle 12. The threads 60 extend from a first end of sleeve 20 to a point short of the opposite end which has an inwardly extending rim 62 formed thereon. A plurality of radially extending fins 64 project radially outwardly from the sleeve 20 adjacent the first end.

The blade 14 is conventional and includes a tang 28 which has a reduced width with respect to the blade itself. Conventional blades of the type illustrated have a hole 66 formed in the tang 28 for being secured by a set screw. At the junction between the blade 14 and the tang 28 there may be upper and lower shoulders 68 and 69, respectively, or only a singled lower shoulder 69 may be present.

Figure 5:
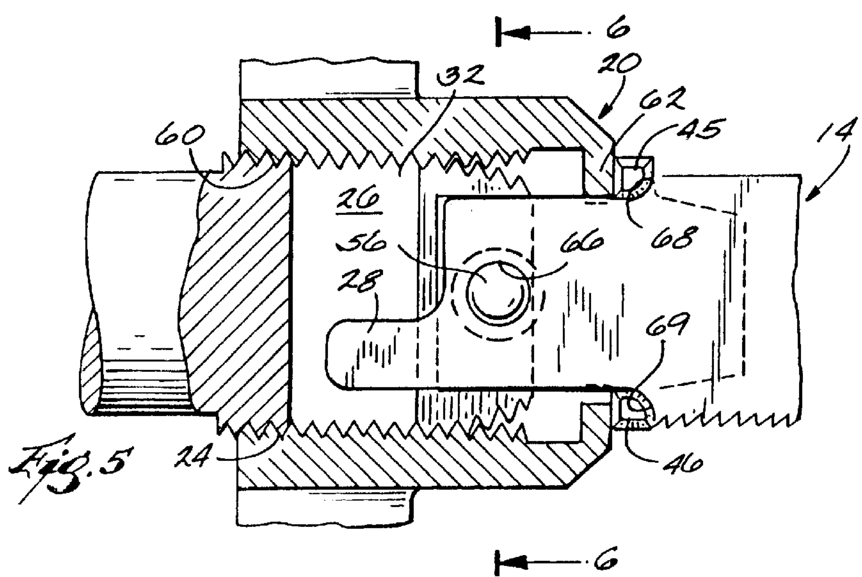
FIG. 5 is a view taken along lines 5—5 of FIG. 4.
Figure 2:
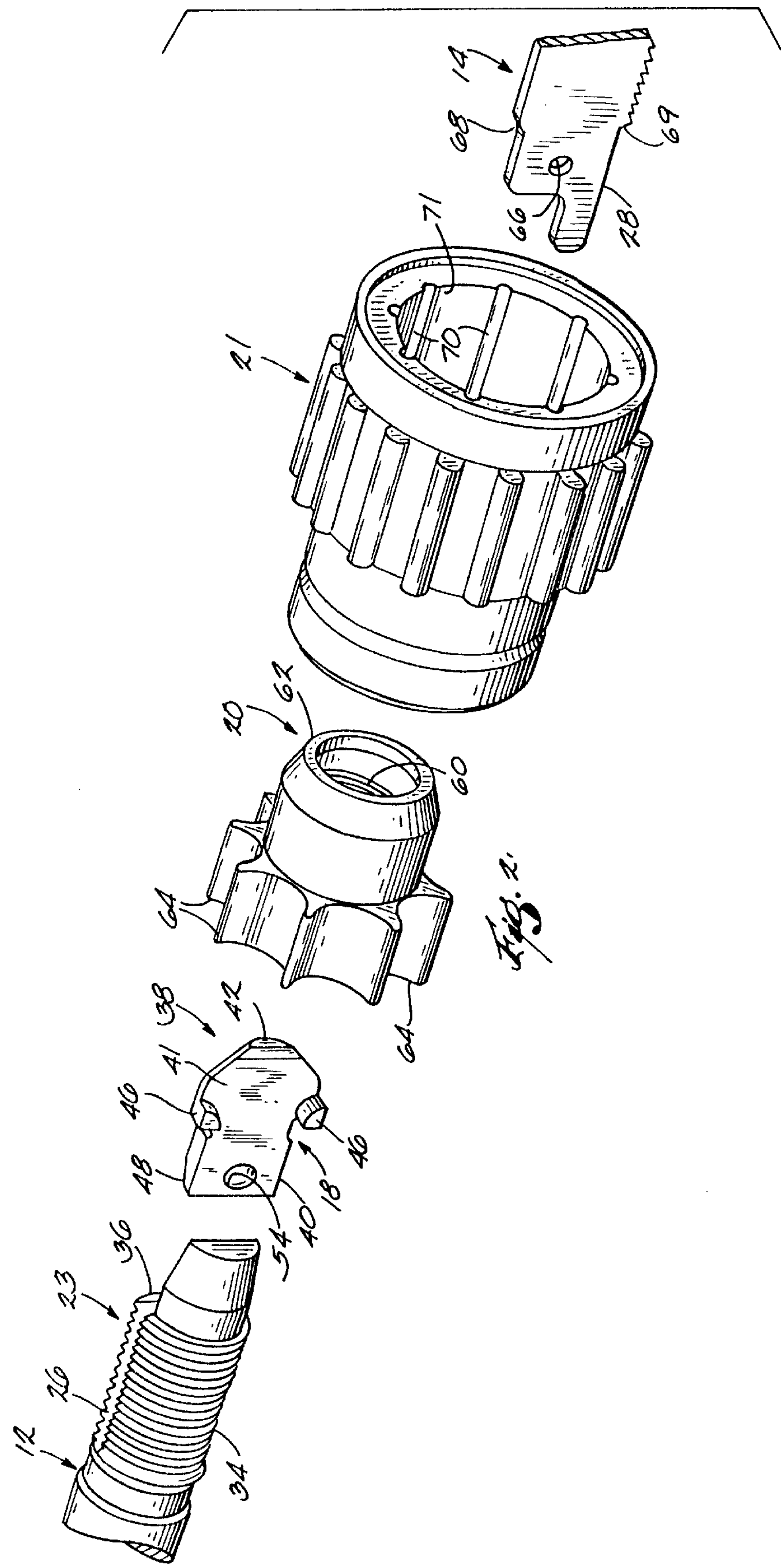
FIG. 2 is an exploded perspective view of the preferred embodiment of the invention.
Figure 3:
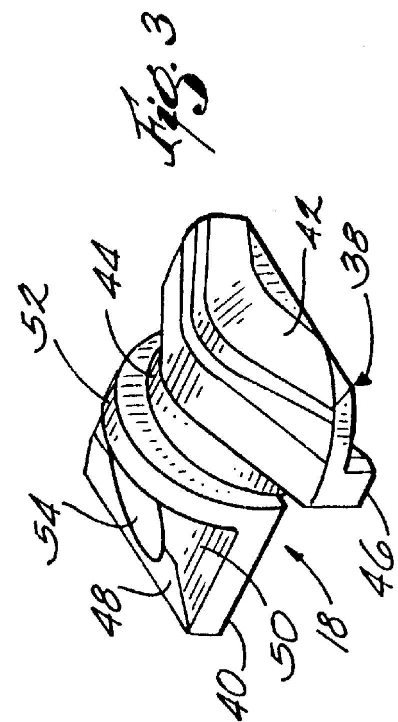
FIG. 3 is a perspective view of a portion of the embodiment of FIG. 2.
Figure 6:
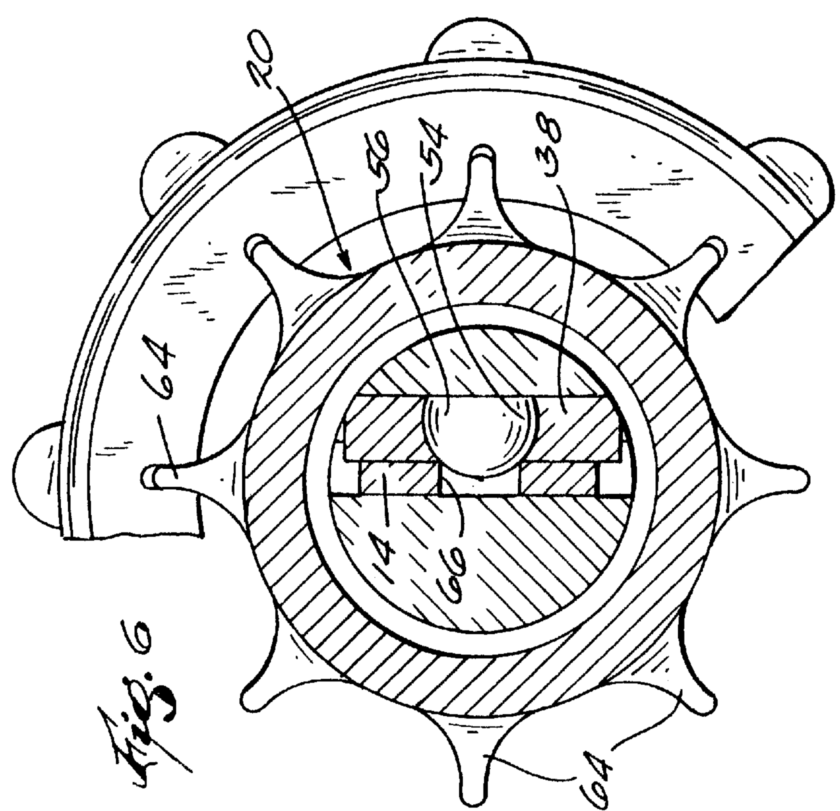
FIG. 6 is a view taken along lines 6—6 of FIG. 5.

As best shown in FIG. 5, the ears 45 and 46 on clamping member 18 are spaced apart from each other and from the ball 56 such that the ears 45 and 46 engage the upper and lower shoulders 68 and 69. The surface of the engaging member 56 engages the rearward edge of the hole 66 in the tang of the saw blade. In the case where the tang 28 only has a single shoulder 69, the ear 45 engages the upper edge of the tang 28.

The clamping member 18 is disposed adjacent the slot 26 with its inclined surface 48 facing the inclined surface 36. In addition, the sleeve 20 is threaded onto the spindle 12 with the rim 62 surrounding the cylindrical section 44 of member 18 and engaging the flange 52. When the tang 28 of blade 14 is inserted into the slot 26, it moves between the surfaces 37 of spindle 12 and 41 of clamping member 18 until the shoulder 68 and 69 engage the ears 45 and 46. At this point, the engaging member 56 engages the rearward rim of hole 66. The sleeve 20 may then be tightened to force the clamping member 18 into the slot 26 and to force the surface 48 of clamping member 18 against the surface 36 of spindle 12. This forces the engaging member 56 against the back of hole 66 so that the blade 14 is urged inwardly toward the saw 10 and the shoulders 68 and 69 are forced against the ears 45 and 46 to provide a rigid three point support for the blade 14. In addition, the nose portion 42 of the clamping member extends past the inner end of tang 28 and onto the blade 14 to prevent the blade from flexing at the intersection with tang 28 thereby reducing the possibility of blade failure at what is otherwise its weakest point. The ears 45 and 46 and the engaging member 56 are also arranged such that the blade 14 tilts downwardly at a slight angle of approximately 3° as seen in FIG. 1 to facilitate cutting. The guide 21 is preferably a tubular member having longitudinal slots 70 on its inner surface 71 for receiving the fins 64. This facilitates the tightening of the sleeve 20 and protects the operator from the reciprocating fins 64.

Figures 7, 8:
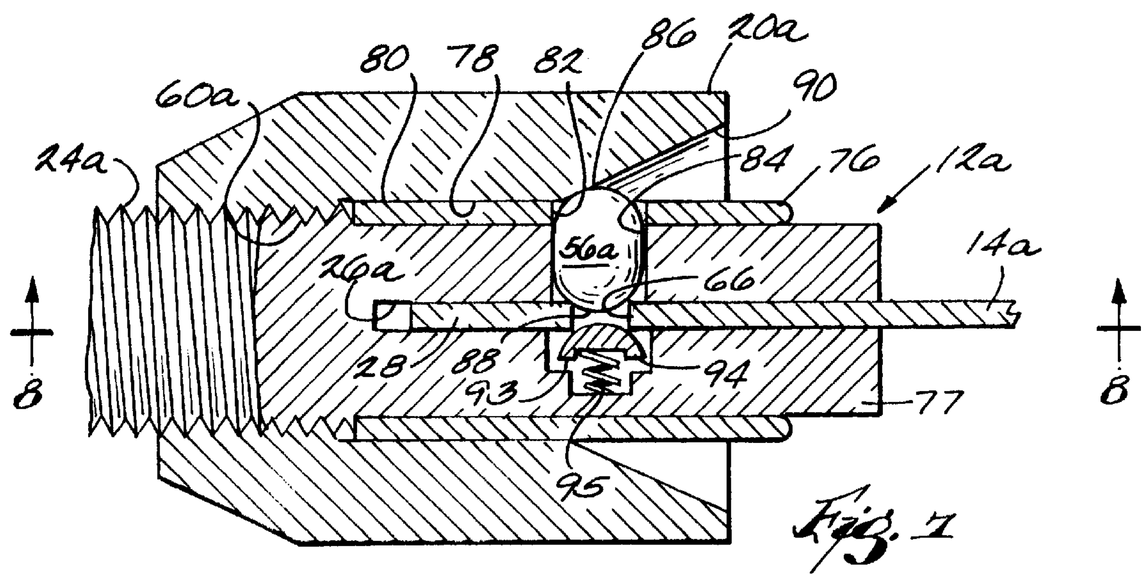
FIG. 7 is a cross-sectional view of a first alternate embodiment of the invention.
FIG. 8 is a view taken along lines 8—8 of FIG. 7.

FIGS. 7 and 8 illustrate an alternate embodiment of the invention which includes a spindle 12*a*, a collar 20*a*, and a sleeve 76 disposed therebetween. The spindle 12*a* has an unthreaded end 77, external threads 24*a* adjacent the unthreaded end 77 and an axial slot 26*a* which extends through the unthreaded end portion. The sleeve 76 surrounds the unthreaded end 77 of spindle 12*a* and the slot 26*a*. The collar 20*a* has internal threads 60*a* at one end which are complementary to the threads 24*a* of the spindle 12*a*. The remaining portion of the inner surface 78 of collar 20*a* is unthreaded and surrounds the outer surface 80 of sleeve 76. Aligned holes 82 and 84 are formed in this sleeve 76 and the spindle 12*a*, respectively, for receiving an engaging member or detent 56*a* having engaging surfaces 86 and 88 at its ends, respectively. The collar 20*a* has an outwardly facing, frusto conical internal surface 90 at its end opposite the threads 60*a* and which engages the outer spherical surface 86 of engaging member 56*a*. The engaging member 56*a* is positioned such that when a blade 14*a* is in the slot 26*a*, the hole 66*a* in the blade tang 28*a* is adjacent the engaging member 56*a*. Upon tightening, the collar 20*a* moves to the right as viewed in FIG. 7 thereby forcing the end 88 of engaging member 56*a* against the rearward rim of the hole 66*a* in blade tang 28*a*. The hole 66*a* is offset relative to engaging member 56*a* so that the rear edge of the hole 66*a* is engaged by the engaging member 56*a*. This forces the blade 14*a* toward the saw 10 thereby forcing the shoulders 68*a* and 69*a* into engagement with the outer edge 92 of the sleeve 76 to provide a firm three point support. The edge 92 is preferably arcuate for engagement with the complementary surface of the shoulders 68*a* and 69*a*.

A second detent 93 may be disposed in a counter sunk hole 94 formed in spindle 12*a* in alignment with the hole 84. A spring 95 urges the detent 93 into the hole 66 on the side of tang 28 opposite the engaging member 56*a*.

Figure 9:
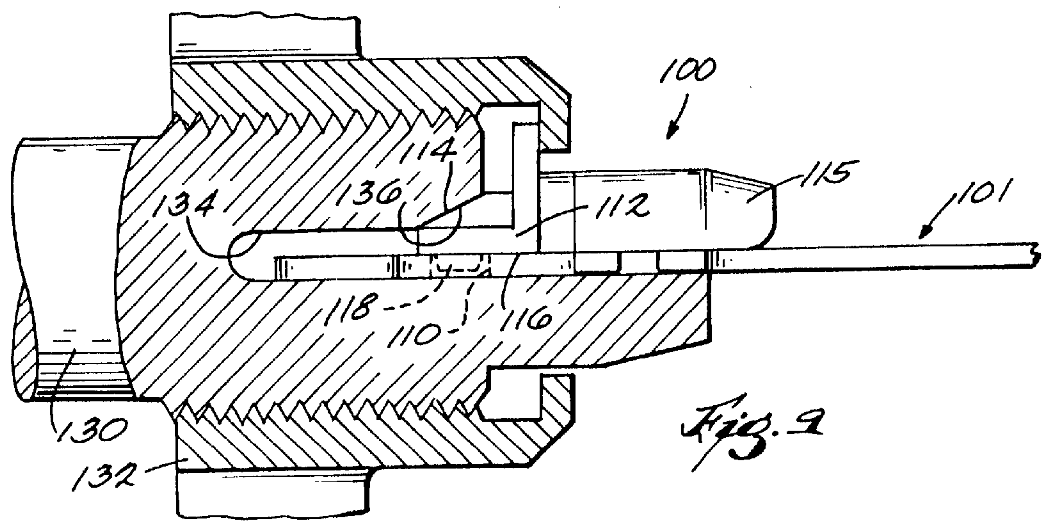
FIGS. 9 and 10 illustrate a second alternate embodiment of the invention.
Figure 10:
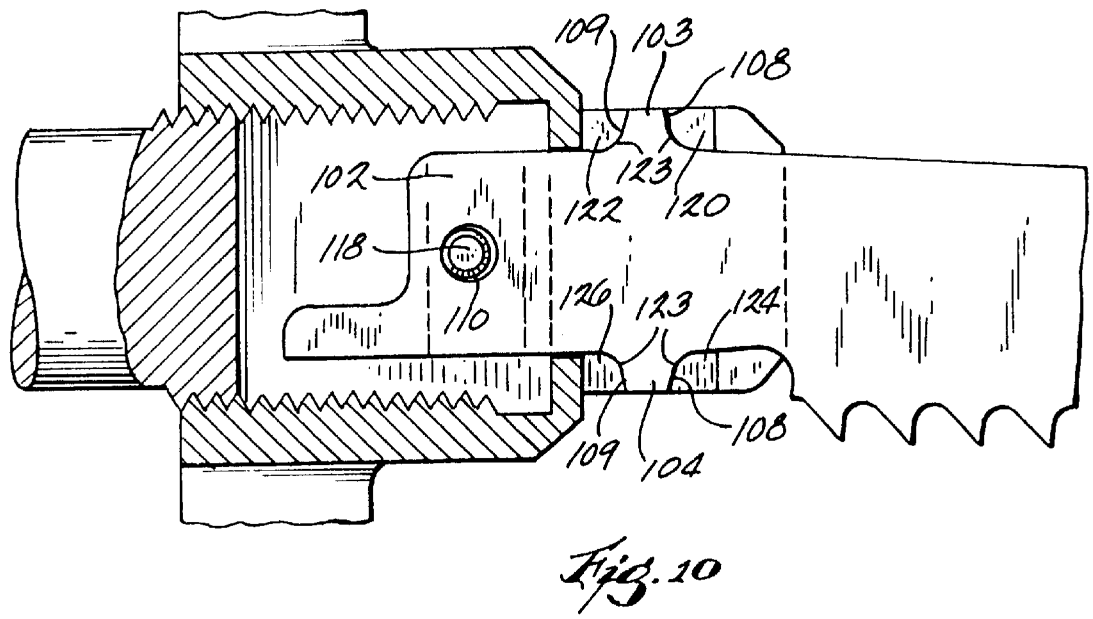

FIGS. 9 and 10 show another alternate embodiment of the invention including a clamp member 100 constructed and arranged to be employed with a sawblade 101 having a modified tang 102. In particular, the tang 102 includes relatively smaller tangs 103 and 104 extending laterally from its opposite sides. Each tang 103 and 104 has forward and rear arcuate edges 108 and 109, respectively, with the edges 108 and 109 converging toward the projecting ends of the tangs 103 and 104. In addition, a hole 110, is formed in the tang 102 rearwardly of the tangs 103 and 104.

The clamping member 100 is similar to that shown in FIGS. 2–6 and includes a rear wedge portion 112 having an inclined surface 114 and a front nose portion 115. The surface 116 of the clamping member 100 on the side opposite the inclined surface 114 is generally planer for engaging the tang 102. A pair of spaced apart ears 120 and 122 extend from the surface 116 and intermediate the ends of the nose portion 116 and are intended to be positioned on opposite sides of the tang 103. A second pair of ears 124 and 126 project from the surface 116 and are intended to be positioned on opposite sides of the tang 104. In addition, an engaging member 118 having the shape of a truncated cone extends outwardly from the surface 116 opposite the wedge portion 112 and is intended to be housed in the hole 110. Each of the ears 120 and 122 and 124 and 126 has an arcuate surface 123 which is complementary with the opposed surface of the tangs 103 and 104. In addition, the ears 122 and 126 and the engaging member 118 are spaced from each other such that when the conical surface of the engaging member 118 engages the rearward edge of the hole 110, the surfaces 123 of ears 122 and 126 engage the edges of the tangs 102 and 103.

The spindle 130 and the sleeve 132 are similar to the corresponding parts of the embodiment of FIGS. 1–5. When the tang 102 of blade 101 is inserted into the slot 134 formed in spindle 130, and between the clamping member 100 and the surface 134 of spindle 130 so that the hole 110 is moved into a position opposite the engaging member 118, the tangs 103 and 104 are positioned between the ears 120 and 122 and 124 and 126 respectively with the surfaces 123 opposed to the tangs 103 and 104. The sleeve 132 may then be tightened to force the inclined surface 114 on the clamping member 100 against the complementary inclined surface 136 on the spindle 130. This forces the engaging member 118 against the rear edge of the hole 110 and the surfaces 123 on ears 122 and 126 into engagement with the tangs 103 and 104. As a result, the blade is urged inwardly of the spindle 130 and firmly locked in position.

While only a few embodiments of the invention have been illustrated and described, it is not intended to be limited thereby but only by the scope of the appended claims.

We claim:

1. A reciprocating tool including a reciprocating member, a blade and a clamp adapted to clamp one end of the blade to the reciprocating member, the blade having a hole formed in the one end, said clamp including first and second clamping means for engaging the blade at spaced apart points, and third clamping means for engaging the hole, said first, second and third clamping means adapted to provide three points of contact between said clamp and the blade, and adjustable means engaging said clamp and said reciprocating member for adjustably forcing said first, second and third clamping means into pressure engagement with the one end of the blade, wherein said reciprocating member is generally tubular and has a free end, a recess formed in the free end of said reciprocating member for receiving the blade, said clamp including a clamp member having a first inclined surface on one side thereof, said first, second and third clamping means being disposed on said clamp member and projecting from the opposite side thereof, a second inclined surface formed in said reciprocating member adjacent said recess, said clamp member being received in said recess for engaging said blade and said second inclined surface.

2. The tool set forth in claim 1 wherein the blade includes at least one shoulder, one of said first and second clamping means being adapted to engage the shoulder of the blade.

3. The tool set forth in claim 1 wherein said clamp member is adapted to engage one side of the blade and adjacent the one end, said first and second clamping means comprising first and second projections on said clamp member for engaging the blade at said spaced apart points.

4. The tool set forth in claim 3 wherein said first, second and third clamping means are mounted on said clamp member, said adjustable means engaging said clamp member for urging said first, second and third clamping means into engagement with the blade.

5. The tool set forth in claim 4 wherein the inclined surface of said clamp member forms a first wedge surface and on one side thereof, a second surface on the opposite side of said clamp member, the inclined surface of said reciprocating member forming a wedge surface and complimentary to the wedge surface on said clamp member, said first, second and third clamping means extending from the second surface, said adjustable means threadably engaging said reciprocating member for forcing said first wedge surface against said second wedge surface to force the opposite surface of said clamp member and said first, second and third clamping means into pressure engagement with the blade.

6. The tool set forth in claim 4 wherein the blade includes a tang portion at the one end thereof and a blade portion, said clamp member having a surface adapted to engage the tang portion and extend therefrom onto the blade to minimize breakage at the junction of the tang portion and the blade portion.

7. The tool set forth in claim 6 wherein the tang portion has a smaller width than that of the blade portion to define at least one shoulder at the junction therebetween, the hole being formed in the tang portion, said first and second clamping means comprising members extending from said surface and adapted to engage the tang portion at the shoulder and at a point spaced from the shoulder, said third clamping means comprising a projector from said surface for engaging the hole in the tang portion.

8. The tool set forth in claim 1 wherein said adjustable means threadably engages the reciprocating member and has a wedge surface formed thereon, said third clamping means comprising detent means engaging said wedge surface and adapted to engage the hole in the blade, said first and second clamping means including the clamp member having spaced apart portions for engaging the blade, said adjustable means engaging said clamp member and said detent means for forcing the detent means and spaced apart portions of said clamp member into engagement with the blade.

9. The tool set forth in claim 8 wherein the blade has a blade portion and a tang portion having a smaller width than that of the blade portion to define at least one shoulder at the junction therebetween, said clamp member being generally tubular and adapted to engage the shoulder and the blade at a point spaced from the shoulder upon adjustment of said adjustable means.

10. The tool set forth in claim 1 wherein an opening in said reciprocating member communicates with said recess, said third clamping means comprising a detent for engaging the hole in the blade, said adjustable means including a threaded sleeve surrounding the free end of the reciprocating member and having a wedge surface engaging said detent for forcing said detent into high pressure engagement with the hole in the blade upon rotation in a first direction and for releasing said detent from high pressure engagement with said blade upon rotation in the opposite direction.

11. A reciprocating tool including a reciprocating member, a blade and clamping means for clamping one end of the blade to said reciprocating member, the blade having a hole formed in the one end, said clamping means including:

first and second engaging means for engaging the blade at spaced apart points and a third engaging means for engaging the hole to thereby provide three points of contact between said clamping means and the blade, and adjustable means coupled to said first and second engaging means and said reciprocating member for adjustably forcing said first and second engaging means into pressure engagement with the end of the blade, wherein the blade includes a blade portion and a tang portion at the one end thereof and having a smaller width than the blade portion to define a pair of shoulders at the junction therebetween, said first and second engaging means adapted to engage the shoulders of the blade, wherein said clamping means is adapted to engage one side of the blade adjacent the one end, said first and second engaging means comprising first and second members for engaging the blade at said spaced apart points, and wherein said clamping means has a first wedge surface formed thereon and on one side thereof, said reciprocating member having a second wedge surface formed thereon and complimentary to the wedge surface on said clamping means, said adjustable means threadably engaging said reciprocating member for forcing said first wedge surface against said second wedge surface to force said first and second members into pressure engagement with the blade.

12. The tool set forth in claim 11 wherein the clamping means is adapted to engage the tang portion and the blade portion to minimize breakage at the junction between the blade portion and the tang portion.

13. The tool set forth in claim 11 wherein said third engaging means further comprises detent means adapted to engage the hole in the blade, wherein adjustment of said adjustable means forces said detent means into pressure engagement with the blade.

14. The tool set forth in claim 11 wherein said reciprocating means is generally tubular and has a free end, a recess formed in the free end of said reciprocating means for receiving the blade, said second wedge surface being positioned in said recess, said clamping means being at least partially received in said recess for engaging the blade.

* * * * *